United States Patent
S Nanal et al.

(10) Patent No.: US 12,271,713 B2
(45) Date of Patent: Apr. 8, 2025

(54) INTELLIGENT ADAPTIVE SELF LEARNING FRAMEWORK FOR DATA PROCESSING ON CLOUD DATA FUSION

(71) Applicant: Accenture Global Solutions Limited, Dublin (IE)

(72) Inventors: Mihir S Nanal, Pune (IN); Shashank Kundanmal Gandhi, Mukundnagar (IN); Sarang Padmakar Joshi, Pune (IN)

(73) Assignee: Accenture Global Solutions Limited, Dublin (IE)

( * ) Notice: Subject to any disclaimer, the term of this patent is extended or adjusted under 35 U.S.C. 154(b) by 390 days.

(21) Appl. No.: 17/969,936

(22) Filed: Oct. 20, 2022

(65) Prior Publication Data

US 2024/0134616 A1  Apr. 25, 2024
US 2024/0231773 A9  Jul. 11, 2024

(51) Int. Cl.
G06F 8/41  (2018.01)
G06N 20/00  (2019.01)

(52) U.S. Cl.
CPC .............. *G06F 8/41* (2013.01); *G06N 20/00* (2019.01)

(58) Field of Classification Search
None
See application file for complete search history.

(56) References Cited

FOREIGN PATENT DOCUMENTS

WO  WO-2019241630 A1 * 12/2019 ......... G06F 16/9024

OTHER PUBLICATIONS

Dong, Xin Luna, and Theodoros Rekatsinas. "Data integration and machine learning: A natural synergy." Proceedings of the 2018 international conference on management of data. 2018. (Year: 2018).*

Gubanov, Michael. "Polyfuse: A large-scale hybrid data fusion system." 2017 IEEE 33rd International Conference on Data Engineering (ICDE). IEEE, 2017. (Year: 2017).*

* cited by examiner

Primary Examiner — Matthew J Brophy
(74) Attorney, Agent, or Firm — Polsinelli PC

(57) ABSTRACT

A device may receive business requirements data for implementing in a cloud data fusion system, and may process the business requirements data, with a machine learning model, to generate a transformation map for transforming the business requirements data. The device may generate code for the cloud data fusion system based on the transformation map, and may identify one or more differences between the code and previous code of the cloud data fusion system. The device may modify the code based on the one or more differences and to generate modified code, and may validate the modified code for transformation logic of the cloud data fusion system to generate final code. The device may perform one or more actions based on the final code.

20 Claims, 11 Drawing Sheets

INTELLIGENT ADAPTIVE SELF LEARNING FRAMEWORK FOR DATA PROCESSING ON CLOUD DATA FUSION

BACKGROUND

A cloud data fusion system is a fully managed, cloud-native, enterprise data integration system for quickly building and managing data pipelines. The cloud data fusion system may provide data integration solutions to clean, prepare, blend, transfer, and transform data, without having to manage a cloud infrastructure.

SUMMARY

Some implementations described herein relate to a method. The method may include receiving business requirements data and data fusion code data for implementing in a cloud data fusion system, and performing natural language processing on the business requirements data and the data fusion code data to generate training data. The method may include training a machine learning model with the training data to generate a trained machine learning model, and processing new business requirements data, with the trained machine learning model, to generate a transformation map for transforming the new business requirements data. The method may include generating code for the cloud data fusion system based on the transformation map, and identifying one or more differences between the code and previous code of the cloud data fusion system. The method may include modifying the code based on the one or more differences and to generate modified code, and validating the modified code for transformation logic of the cloud data fusion system to generate final code. The method may include performing one or more actions based on the final code.

Some implementations described herein relate to a device. The device may include one or more memories and one or more processors coupled to the one or more memories. The one or more processors may be configured to receive business requirements data for implementing in a cloud data fusion system, and process the business requirements data, with a machine learning model, to generate a transformation map for transforming the business requirements data. The one or more processors may be configured to generate code for the cloud data fusion system based on the transformation map, and identify one or more differences between the code and previous code of the cloud data fusion system. The one or more processors may be configured to modify the code based on the one or more differences and to generate modified code, and validate the modified code for transformation logic of the cloud data fusion system to generate final code. The one or more processors may be configured to perform one or more actions based on the final code.

Some implementations described herein relate to a non-transitory computer-readable medium that stores a set of instructions for a device. The set of instructions, when executed by one or more processors of the device, may cause the device to receive business requirements data and data fusion code data for implementing in a cloud data fusion system, and perform natural language processing on the business requirements data and the data fusion code data to generate training data. The set of instructions, when executed by one or more processors of the device, may cause the device to train a machine learning model with the training data to generate a trained machine learning model, and receive new business requirements data for implementing in the cloud data fusion system. The set of instructions, when executed by one or more processors of the device, may cause the device to process the new business requirements data, with the trained machine learning model, to generate a transformation map for transforming the new business requirements data, and generate code for the cloud data fusion system based on the transformation map. The set of instructions, when executed by one or more processors of the device, may cause the device to identify one or more differences between the code and previous code of the cloud data fusion system, and modify the code based on the one or more differences and to generate modified code. The set of instructions, when executed by one or more processors of the device, may cause the device to validate the modified code for transformation logic of the cloud data fusion system to generate final code, and perform one or more actions based on the final code.

DETAILED DESCRIPTION

Figure 1A:
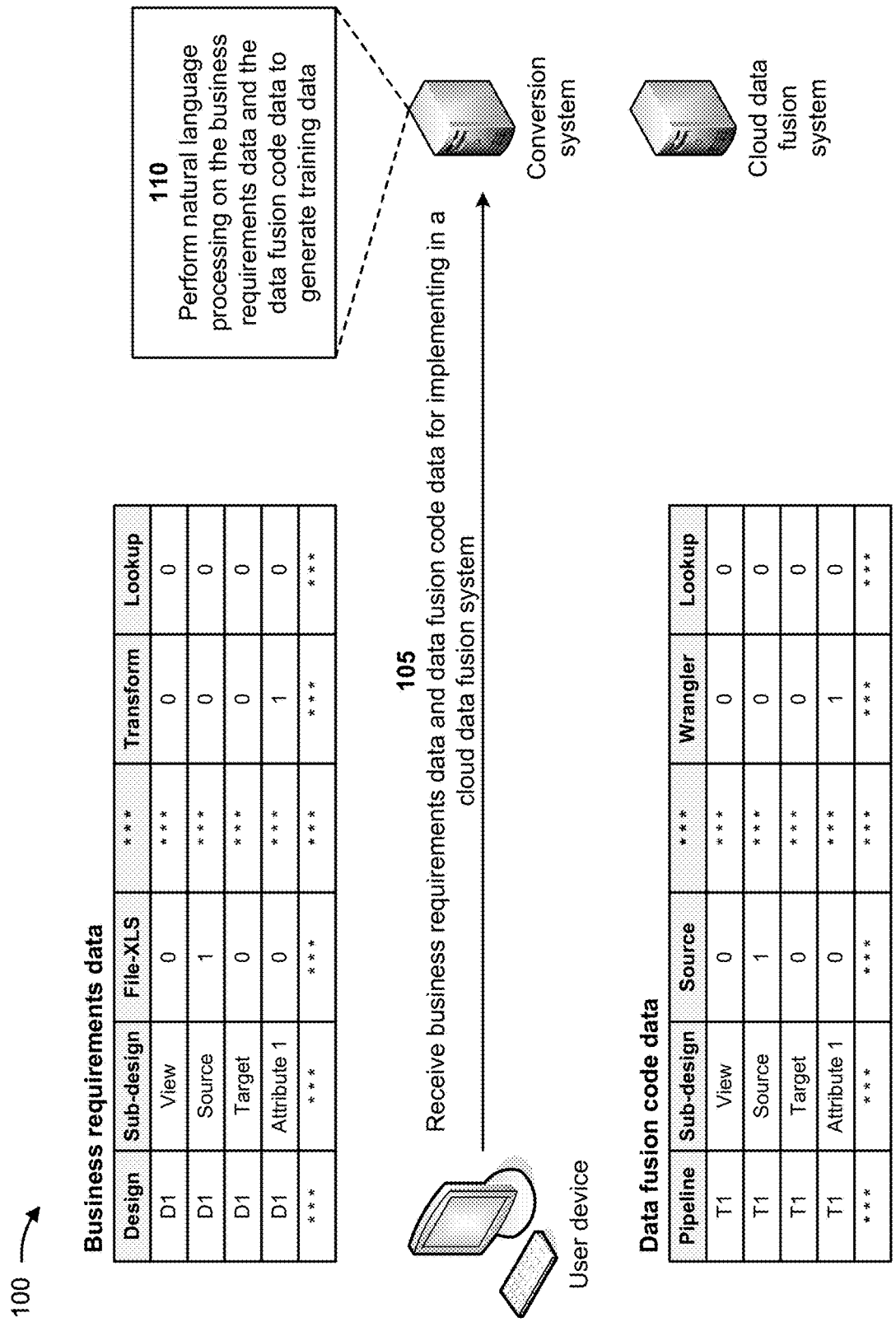
FIGS. 1A-1G are diagrams of an example implementation described herein.

The following detailed description of example implementations refers to the accompanying drawings. The same reference numbers in different drawings may identify the same or similar elements.

Conversion of business requirements for implementation in a cloud data fusion system requires a manual and time-consuming process of analyzing the business requirements, generating and implementing code based on the business requirements, and validating the code. Furthermore, any changes in the code after implementation or code validation failures requires repeating the manual and time-consuming process. The manual and time-consuming process makes it difficult to ensure complete or optimal coverage of the business requirements in the code, and fails to provide a mechanism for implementing the code in the cloud data fusion system. Therefore, current techniques for utilizing a cloud data fusion system consume computing resources (e.g., processing resources, memory resources, communication resources, and/or the like), networking resources, and/or the like associated with manually analyzing business requirements, generating code, validating the code, failing to provide complete and optimal code for business requirements, discovering and correcting code that is not complete and/or optimal, handling data lost due to the incomplete and/or not optimal code, and/or the like.

Some implementations described herein relate to a conversion system that utilizes a machine learning model to convert requirements for implementation in a cloud data fusion environment. For example, the conversion system may receive business requirements data and data fusion code data for implementing in a cloud data fusion system, and may perform natural language processing on the business requirements data and the data fusion code data to generate training data. The conversion system may train a machine learning model with the training data to generate a trained machine learning model, and may process new business requirements data, with the trained machine learning model, to generate a transformation map for transforming the new business requirements data. The conversion system may generate code for the cloud data fusion system based on the transformation map, and may identify one or more differences between the code and previous code of the cloud data fusion system. The conversion system may modify the code based on the one or more differences and to generate modified code, and may validate the modified code for transformation logic of the cloud data fusion system to generate final code. The conversion system may perform one or more actions based on the final code.

In this way, the conversion system utilizes a machine learning model to convert requirements for implementation in a cloud data fusion environment. The conversion system may establish a relationship between business requirements and a cloud data fusion system implementation, and may utilize the relationship to transform the business requirements into code for the cloud data fusion system. The conversion system may analyze transformation logic in business requirements and previous code, and may convert the business requirements and the previous code to training data for training a machine learning model. The conversion system may utilize the machine learning model to generate a transformation map for transforming new business requirements into code for the cloud data fusion system. The conversion system may automatically generate the code using the transformation map, and may update the code based on changes in transformation logic. The conversion system may validate a correctness of the code, and may provide a feedback loop to the machine learning model. This, in turn, conserves computing resources, networking resources, and/or the like that would otherwise have been consumed in manually analyzing business requirements, generating code, validating the code, failing to provide complete and optimal code for business requirements, discovering and correcting code that is not complete and/or optimal, handling data lost due to the incomplete and/or not optimal code, and/or the like.

FIGS. 1A-1G are diagrams of an example 100 associated with utilizing a machine learning model to convert requirements for implementation in a cloud data fusion environment. As shown in FIGS. 1A-1G, example 100 includes a user device and a cloud data fusion system associated with a conversion system. The cloud fusion data system may include a cloud computing environment based system for quickly building and managing data pipelines. The cloud data fusion system may provide data integration solutions to clean, prepare, blend, transfer, and transform data, without having to manage a cloud infrastructure. The conversion system may include a system that utilizes a machine learning model to convert requirements for implementation in a cloud data fusion environment. Further details of the user device, the cloud data fusion system, and the conversion system are provided elsewhere herein.

As shown in FIG. 1A, and by reference number 105, the conversion system may receive business requirements data and data fusion code data for implementing in a cloud data fusion system. For example, the user device and/or the cloud data fusion system may generate the business requirements data and the data fusion code data, and may provide the business requirements data and the data fusion code data to the conversion system. The conversion system may receive the business requirements data and the data fusion code data from the user device and/or the cloud data fusion system. In some implementations, the conversion system may continuously receive the business requirements data and the data fusion code data from the user device and/or the cloud data fusion system, may periodically receive the business requirements data and the data fusion code data from the user device and/or the cloud data fusion system, may receive the business requirements data and the data fusion code data from the user device and/or the cloud data fusion system based on providing a request for the business requirements data and the data fusion code data to the user device and/or the cloud data fusion system. In some implementations, the business requirements data and the data fusion code data may be historical business requirements data and historical data fusion code data implemented by the cloud data fusion system.

The business requirements data may include data identifying a source target layout for the business requirements; a type of source (e.g., a file, a database, an application programming interface (API), and/or the like) associated with the business requirements; join, filter, and/or sort conditions associated with the business requirements; lookups associated with the business requirements; personal data identification associated with the business requirements; data exclusion and/or filtering logic associated with the business requirements; and/or the like. The data fusion code data may include data identifying components of the data fusion code; a configuration of the data fusion code; wrangler conditions associated with the data fusion code (e.g., data wrangler in cloud data fusion enables selecting a column, applying a filter to the selected column, changing a format of the selected column, and copying or extracting fields from the selected column); component sequencing associated with the data fusion code; a data layout associated with the data fusion code; an environment associated with the data fusion code; and/or the like.

As further shown in FIG. 1A, and by reference number 110, the conversion system may perform natural language processing on the business requirements data and the data fusion code data to generate training data. For example, the conversion system may process the business requirements data and the data fusion code data, with a natural language processing model, to generate the training data in a format that is understood by a machine learning model, as described below. In some implementations, when performing the natural language processing on the business requirements data and the data fusion code data to generate the training data, the conversion system may parse the business requirements data and the data fusion code data to generate parsed data. The conversion system may perform the natural language processing on the parsed data to generate the training data in a format for consumption by the machine learning model.

Figure 1B:
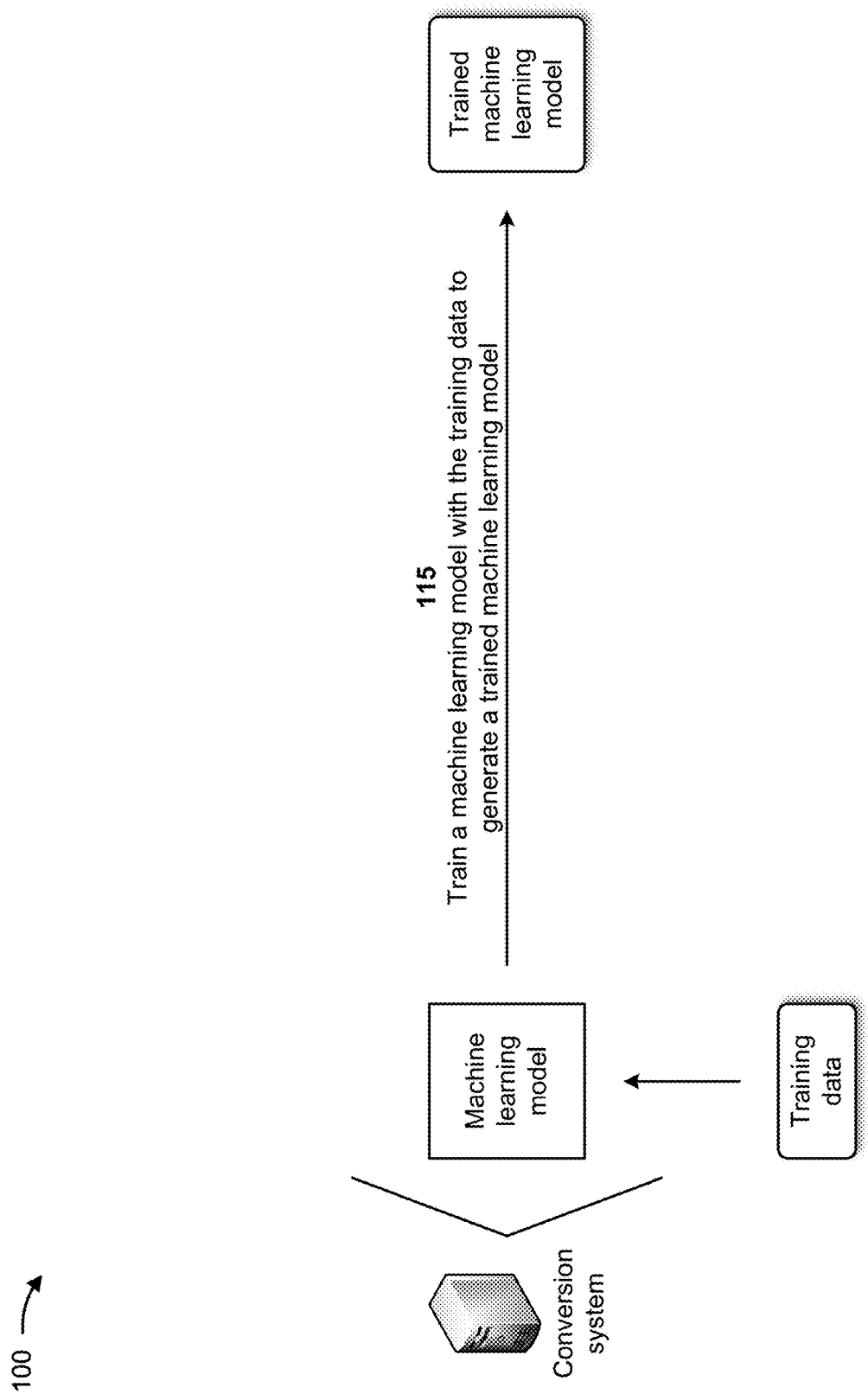

As shown in FIG. 1B, and by reference number 115, the conversion system may train a machine learning model with the training data to generate a trained machine learning model. For example, the conversion system may divide the training data into a first portion of training data, a second portion of training data, and a third portion of training data. The first portion, the second portion, and the third portion may include a same quantity of the training data, different quantities of the training data, and/or the like. In some implementations, more of the training data may be allotted to the first portion of training data since the first portion may be utilized to generate the training dataset for the machine learning model. Further details of training a machine learning model are described below in connection with FIG. 2.

The conversion system may generate a training dataset for the machine learning model based on the first portion of training data. The conversion system may generate a validation dataset for the machine learning model based on the second portion of training data. The conversion system may generate a test dataset for the machine learning model based on the third portion of training data. In other implementations, the conversion system may utilize different portions of the training data to generate the training dataset, the validation dataset, and/or the test dataset for the machine learning model.

The conversion system may train the machine learning model with the training dataset to generate the trained machine learning model. As described elsewhere herein, the machine learning model may be trained to process new business requirements data, and generate a transformation map for transforming the new business requirements data for utilization with the cloud data fusion system. In some implementations, rather than training the machine learning model, the conversion system may obtain the trained machine learning model from another system or device that trained the machine learning model. In this case, the conversion system may provide the other system or device with the training dataset, the validation dataset, and/or the test dataset for use in training the machine learning model, and may provide the other system or device with updated training, validation, and/or test datasets to retrain the machine learning model in order to update the machine learning model.

In some implementations, the machine learning model may include a clustering model. A clustering model may use cluster analysis (also known as clustering) to perform machine learning. Cluster analysis is the task of grouping a set of objects in such a way that objects in the same group (called a cluster) are more similar (in some sense) to each other than to objects in other groups (clusters). Cluster analysis can be achieved by various algorithms that differ significantly in their notion of what constitutes a cluster and how to efficiently find them. Popular notions of clusters include groups with small distances between cluster members, dense areas of the data space, intervals or particular statistical distributions, and/or the like. Different cluster models (with correspondingly different cluster algorithms) may include connectivity models (e.g., where hierarchical clustering builds models based on distance connectivity), centroid models (e.g., where the k-means algorithm represents each cluster by a single mean vector), distribution models (e.g., where clusters are modeled using statistical distributions, such as multivariate normal distributions used by the expectation-maximization algorithm), density models (e.g., where clusters are defined as connected dense regions in the data space, and/or the like.

In some implementations, the conversion system may train the machine learning model with the training dataset to generate the trained machine learning model, and may process the validation dataset, with the trained machine learning model, to validate that the trained machine learning model is operating correctly. If the trained machine learning model is operating correctly, the conversion system may process the trained machine learning model, with the test dataset, to further ensure that the trained machine learning model is operating correctly. A trained machine learning model can be said to be operating correctly if it has adequate accuracy, has adequate precision, has adequate recall, is not subject to excessive overfitting, and/or the like. If the trained machine learning model is operating excessively incorrectly, the conversion system may modify the trained machine learning model and may revalidate and/or retest the modified machine learning model based on the validation dataset and/or the test dataset.

Figure 1C:
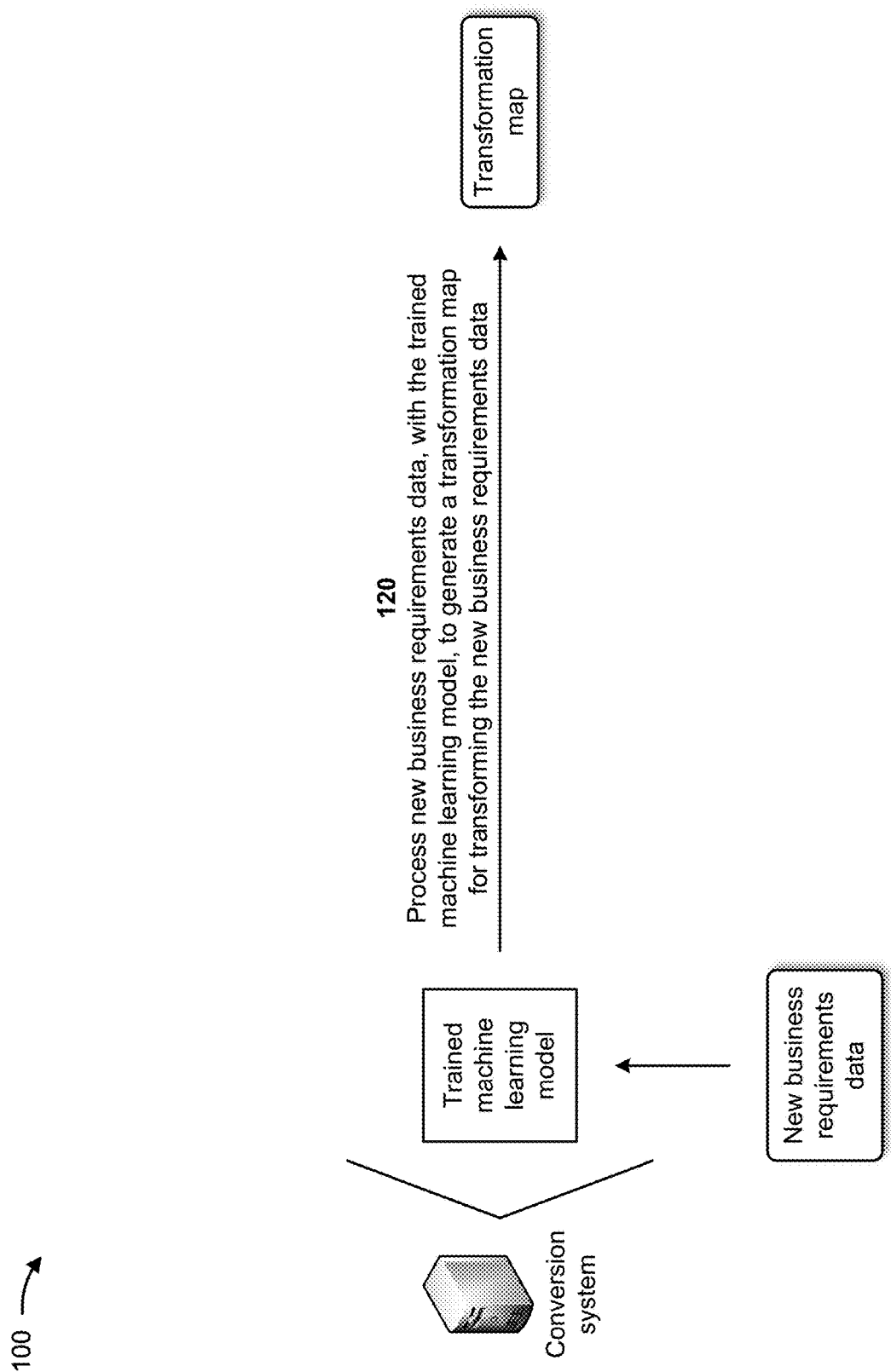

As shown in FIG. 1C, and by reference number 120, the conversion system may process new business requirements data, with the trained machine learning model, to generate a transformation map for transforming the new business requirements data. For example, a user may utilize the user device to input the new business requirements data, and may cause the user device to provide the new business requirements data to the conversion system. The conversion system may receive the new business requirements data from the user device. The new business requirements data may include data identifying a source target layout for the new business requirements; a type of source (e.g., a file, a database, an API, and/or the like) associated with the new business requirements; join, filter, and/or sort conditions associated with the new business requirements; lookups associated with the new business requirements; personal data identification associated with the new business requirements; data exclusion and/or filtering logic associated with the new business requirements; and/or the like. The conversion system may utilize the trained machine learning model to generate the transformation map based on the new business requirements. In some implementations, the transformation map may include information for transforming the new business requirements data for utilization with the cloud data fusion system.

In some implementations, when processing the new business requirements data, with the trained machine learning model, to generate the transformation map, the conversion system may calculate input design coordinates based on the new business requirements data, and may calculate average Euclidean distances (e.g., D1, D2, D3, and/or the like) associated with the input design coordinates. For example, the conversion system may be associated with a design catalog that includes previous design coordinates (e.g., T1, T2, T3, and/or the like) associated with previous designs utilized by the cloud data fusion system. The conversion system may calculate the average Euclidean distances between the previous design coordinates (e.g., provided in the design catalog) and the input design coordinates. The conversion system may determine whether one of the input design coordinates is associated with a smallest average Euclidean distance. When the one of the input design coordinates is associated with a smallest average Euclidean distance, the conversion system may generate the transformation map based on the one of the input design coordinates. For example, the conversion system may select, as the transformation map, a previous transformation map associated with one of the previous design coordinates that has the smallest average Euclidean distance with the one of the input design coordinates.

When none of the input design coordinates are associated with a smallest average Euclidean distance, the conversion system may select a set of the input design coordinates satisfying a threshold, and may calculate average Euclidean distances between the set of the input design coordinates and requirements for the cloud data fusion system (e.g., the previous design coordinates from the design catalog). The conversion system may select the one of the input design coordinates, from the set of the input design coordinates, that has the smallest average Euclidean distance with one of the previous design coordinates.

In some implementations, when processing the new business requirements data, with the trained machine learning model, to generate the transformation map, the conversion system may utilize the trained machine learning model to determine, based on the new business requirements data, recommendations for components and configuration sequences of the cloud data fusion system. The conversion system may then generate the transformation map based on the recommendations for the components and the configuration sequences of the cloud data fusion system.

Figure 1D:
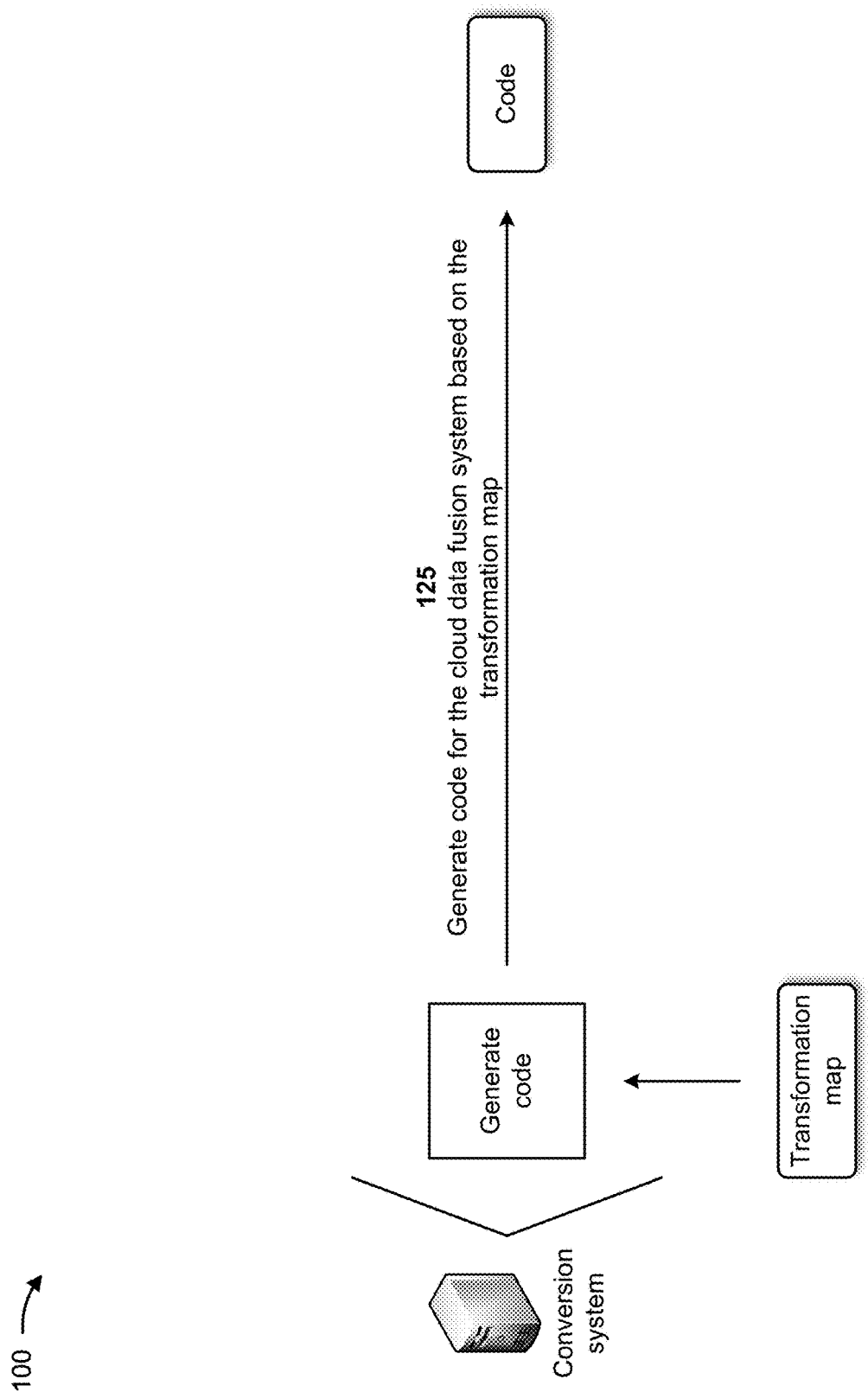

As shown in FIG. 1D, and by reference number 125, the conversion system may generate code for the cloud data fusion system based on the transformation map. For example, the conversion system may parse the transformation map based on the recommendations for the components and the configuration sequences of the cloud data fusion system provided in the transformation map. The conversion system may generate the code for the cloud data fusion system based on the parsed transformation map. In some implementations, when generating the code for the cloud data fusion system based on the transformation map, the conversion system may initialize properties for components of the code to be utilized in the cloud data fusion system based on the parsed transformation map.

Figure 1E:
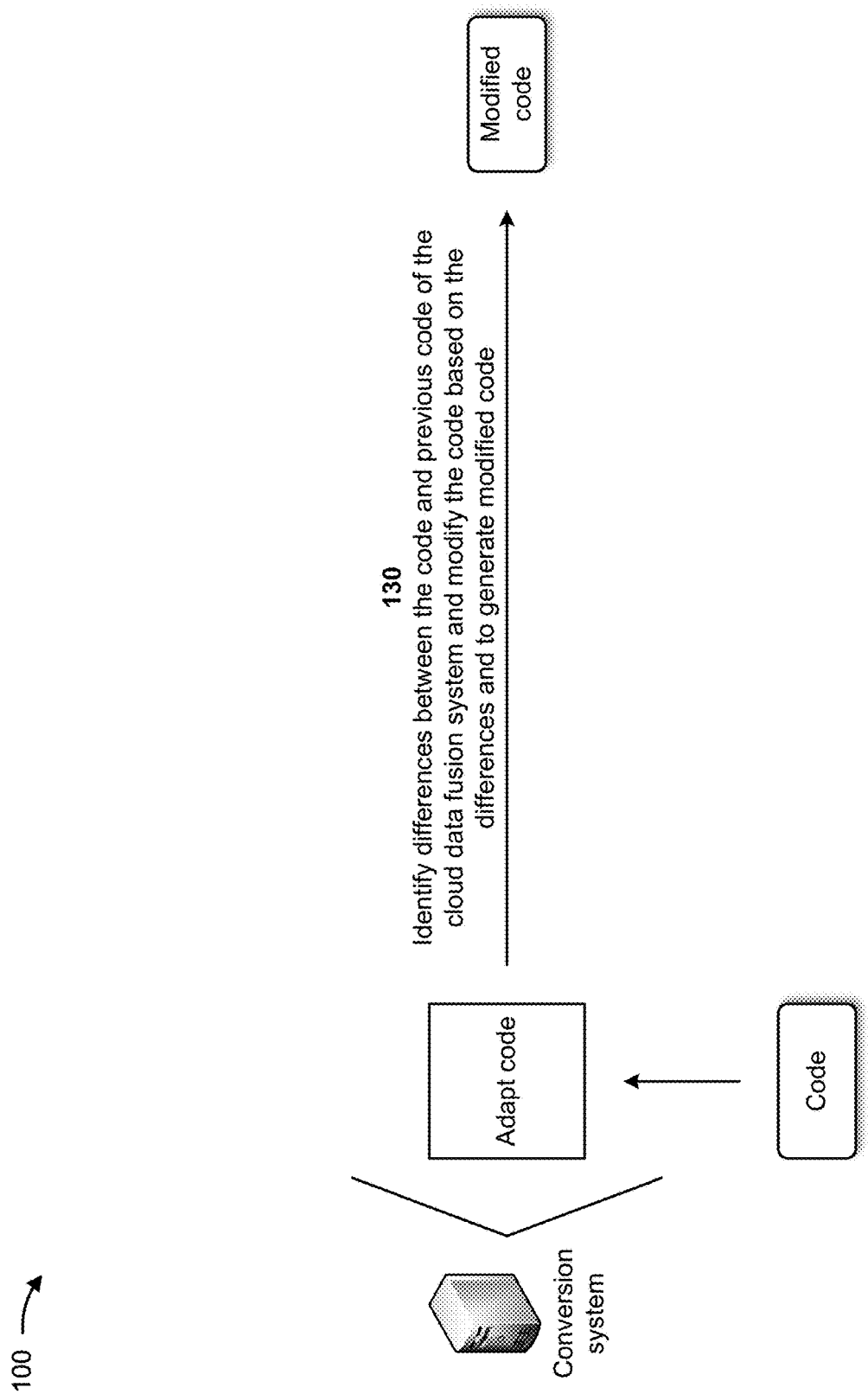

As shown in FIG. 1E, and by reference number 130, the conversion system may identify differences between the code and previous code of the cloud data fusion system and may modify the code based on the differences and to generate modified code. For example, the conversion system may include intelligent adapter logic to update the code based on changes in transformation logic (e.g., the differences between the code and previous code of the cloud data fusion system). In some implementations, the intelligent adapter logic may modify the code, to generate the modified code, based on the differences between the code and the previous code of the cloud data fusion system. In some implementations, when identifying the differences between the code and the previous code of the cloud data fusion system, the conversion system may identify impacts of the differences on the previous code of the cloud data fusion system, and may modify the code based on the impacts of the differences. If there are no differences between the code and the previous code of the cloud data fusion system, the conversion system may not modify the code and may proceed to validate the code without modification.

Figure 1F:
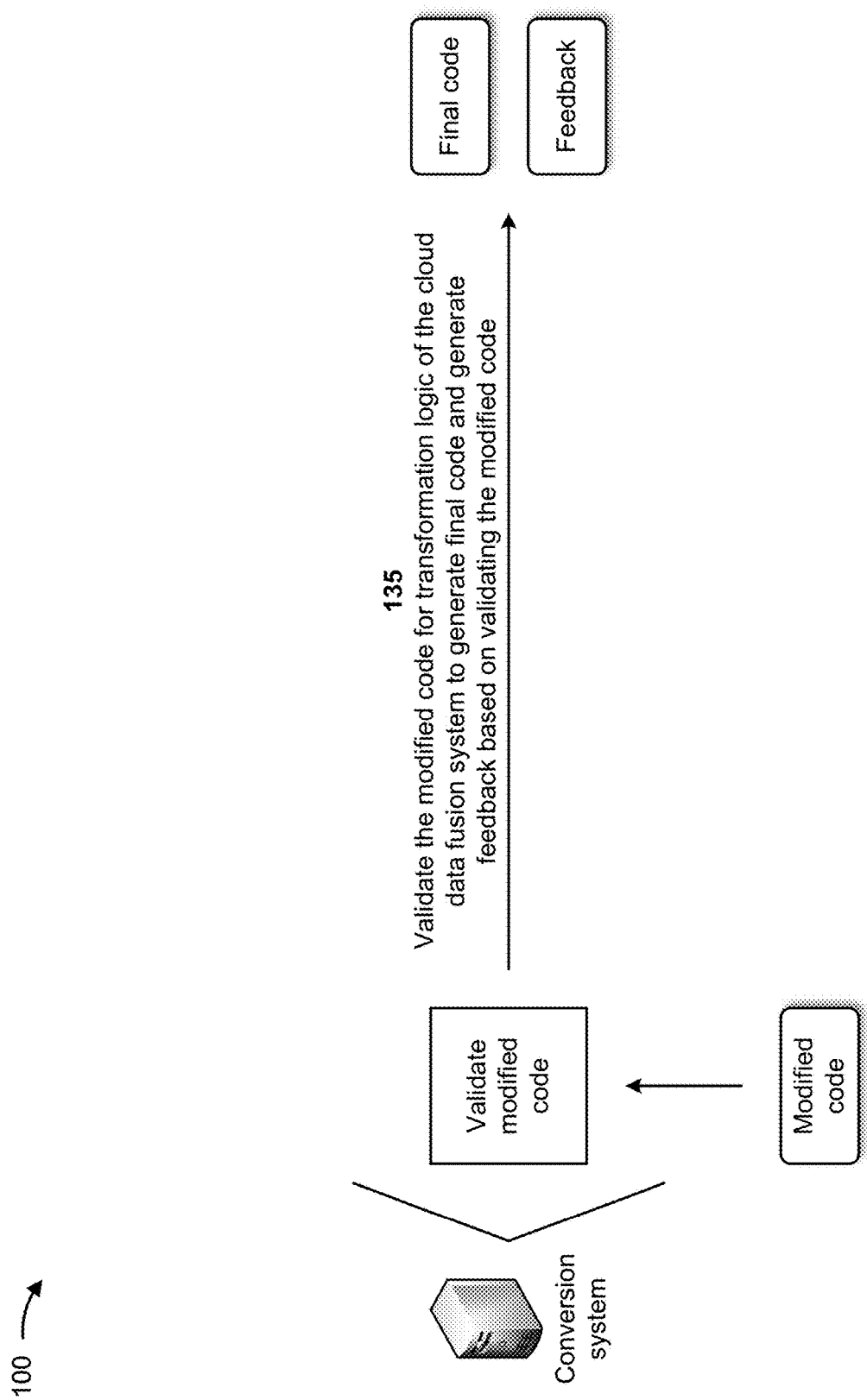

As shown in FIG. 1F, and by reference number 135, the conversion system may validate the modified code for transformation logic of the cloud data fusion system to generate final code, and may generate feedback based on validating the modified code. For example, the conversion system may include validation logic to validate a correctness of the modified code. In some implementations, the conversion system may validate the correctness of the modified code by validating the modified code for the transformation logic of the cloud data fusion system to generate the final code. When validating the modified code for the transformation logic of the cloud data fusion system to generate the final code, the conversion system may determine expected values based on the transformation logic of the cloud data fusion system, and may determine values for the modified code. The conversion system may compare the expected values and the values determined for the modified code, and may validate the modified code for the transformation logic of the cloud data fusion system, to generate the final code, based on the expected values matching (e.g., being within a threshold) of the values determined for the modified code.

In some implementations, when validating the modified code for the transformation logic of the cloud data fusion system to generate the final code, the conversion system may generate one or more validation errors based on the expected values failing to match (e.g., failing to be within the threshold) of the values determined for the modified code. In such implementations, the conversion system may not validate the modified code and may retrain the machine learning model based on the one or more validation errors. Once the machine learning model is retrained, the conversion system may utilize the retrained machine learning model to generate a new transformation map. The conversion system may utilize the new transformation map to generate new code or new modified code that may be validated by the conversion system.

Figure 1G:
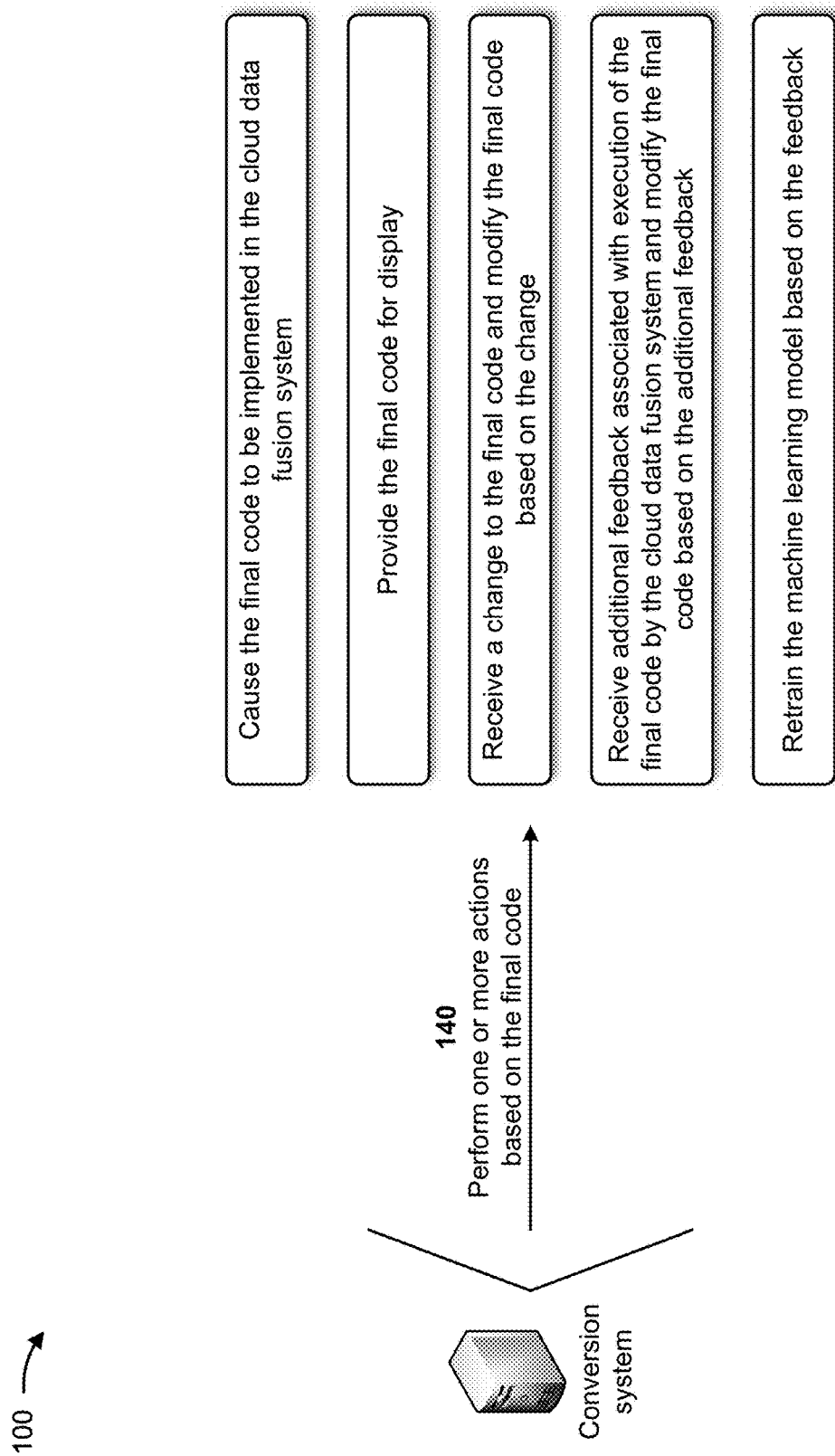

As shown in FIG. 1G, and by reference number 140, the conversion system may perform one or more actions based on the final code. In some implementations, performing the one or more actions includes the conversion system causing the final code to be implemented in the cloud data fusion system. For example, the conversion system may provide the final code to the cloud data fusion system with an instruction to implement the final code. The cloud data fusion system may implement the final code based on the instruction and may utilize the final code to satisfy the new business requirements received by the conversion system. In this way, the conversion system may conserve computing resources, networking resources, and/or the like that would otherwise have been consumed in manually analyzing business requirements, generating code, and validating the code.

In some implementations, performing the one or more actions includes the conversion system providing the final code for display. For example, the conversion system may provide the final code to the user device, and the user device may display the final code to the user of the user device. The user may analyze the displayed final code, may modify the final code, may cause the final code to be implemented by the cloud data fusion system, and/or the like. In this way, the conversion system may conserve computing resources, networking resources, and/or the like that would otherwise have been consumed in failing to provide complete and optimal code for business requirements.

In some implementations, performing the one or more actions includes the conversion system receiving a change to the final code and modifying the final code based on the change. For example, the user of the user device may cause the user device to provide the change to the final code to the conversion system, and the conversion system may receive the change to the final code. The conversion system may modify the final code based on the change prior to implementing the final code in the cloud data fusion system. In this way, the conversion system may conserve computing resources, networking resources, and/or the like that would otherwise have been consumed in discovering and correcting code that is not complete and/or optimal.

In some implementations, performing the one or more actions includes the conversion system receiving additional feedback associated with execution of the final code by the cloud data fusion system, and modifying the final code based on the additional feedback. For example, the cloud data fusion system may implement the final code and may generate feedback identifying errors associated with implementing the final code. The cloud data fusion system may provide the feedback to the conversion system, and the conversion system may receive the feedback. The conversion system may modify the final code based on the feedback identifying the errors. In this way, the conversion system may conserve computing resources, networking resources, and/or the like that would otherwise have been consumed in handling data lost due to the incomplete and/or not optimal code.

In some implementations, performing the one or more actions includes the conversion system retraining the machine learning model based on the feedback. For example, the conversion system may utilize the feedback as additional training data for retraining the machine learning model, thereby increasing the quantity of training data available for training the machine learning model. Accordingly, the conversion system may conserve computing resources associated with identifying, obtaining, and/or generating historical data for training the machine learning model relative to other systems for identifying, obtaining, and/or generating historical data for training machine learning models.

In this way, the conversion system utilizes a machine learning model to convert requirements for implementation in a cloud data fusion environment. The conversion system may establish a relationship between business requirements and a cloud data fusion system implementation, and may utilize the relationship to transform the business requirements into code for the cloud data fusion system. The conversion system may analyze transformation logic in business requirements and previous code, and may convert the business requirements and the previous code to training data for training a machine learning model. The conversion system may utilize the machine learning model to generate a transformation map for transforming new business requirements into code for the cloud data fusion system. The conversion system may automatically generate the code using the transformation map, and may update the code based on changes in transformation logic. The conversion system may validate a correctness of the code, and may provide a feedback loop to the machine learning model. This, in turn, conserves computing resources, networking resources, and/or the like that would otherwise have been consumed in manually analyzing business requirements, generating code, validating the code, failing to provide complete and optimal code for business requirements, discovering and correcting code that is not complete and/or optimal, handling data lost due to the incomplete and/or not optimal code, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
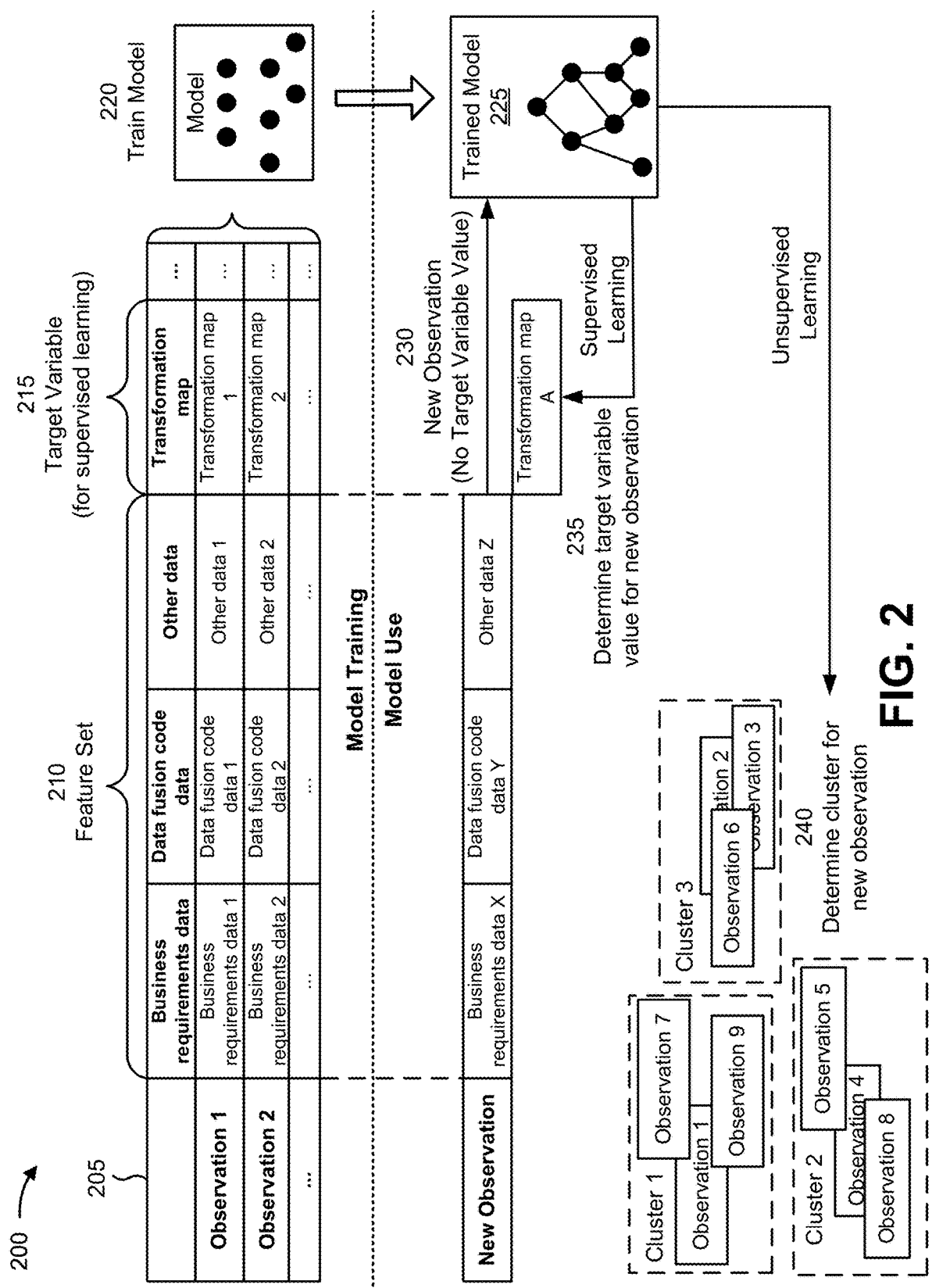
FIG. 2 is a diagram illustrating an example of training and using a machine learning model.

FIG. 2 is a diagram illustrating an example 200 of training and using a machine learning model for converting requirements for implementation in a cloud data fusion environment. The machine learning model training and usage described herein may be performed using a machine learning system. The machine learning system may include or may be included in a computing device, a server, a cloud computing environment, and/or the like, such as the conversion system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the conversion system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the conversion system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of business requirements data, a second feature of data fusion code data, a third feature of other data, and so on. As shown, for a first observation, the first feature may have a value of business requirements data 1, the second feature may have a value of data fusion code data 1, the third feature may have a value of other data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be labelled transformation map and may include a value of transformation map 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of business requirements data X, a second feature of data fusion code data Y, a third feature of other data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of transformation map A for the target variable of the transformation map, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a business requirements data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a data fusion code data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to convert requirements for implementation in a cloud data fusion environment. The machine learning system enables recognition and/or identification of tens, hundreds, thousands, or millions of features and/or feature values for tens, hundreds, thousands, or millions of observations, thereby increasing accuracy and consistency and reducing delay associated with converting requirements for implementation in a cloud data fusion environment relative to requiring computing resources to be allocated for tens, hundreds, or thousands of operators to manually convert requirements for implementation in a cloud data fusion environment.

As indicated above, FIG. 2 is provided as an example. Other examples may differ from what is described in connection with FIG. 2.

Figure 3:
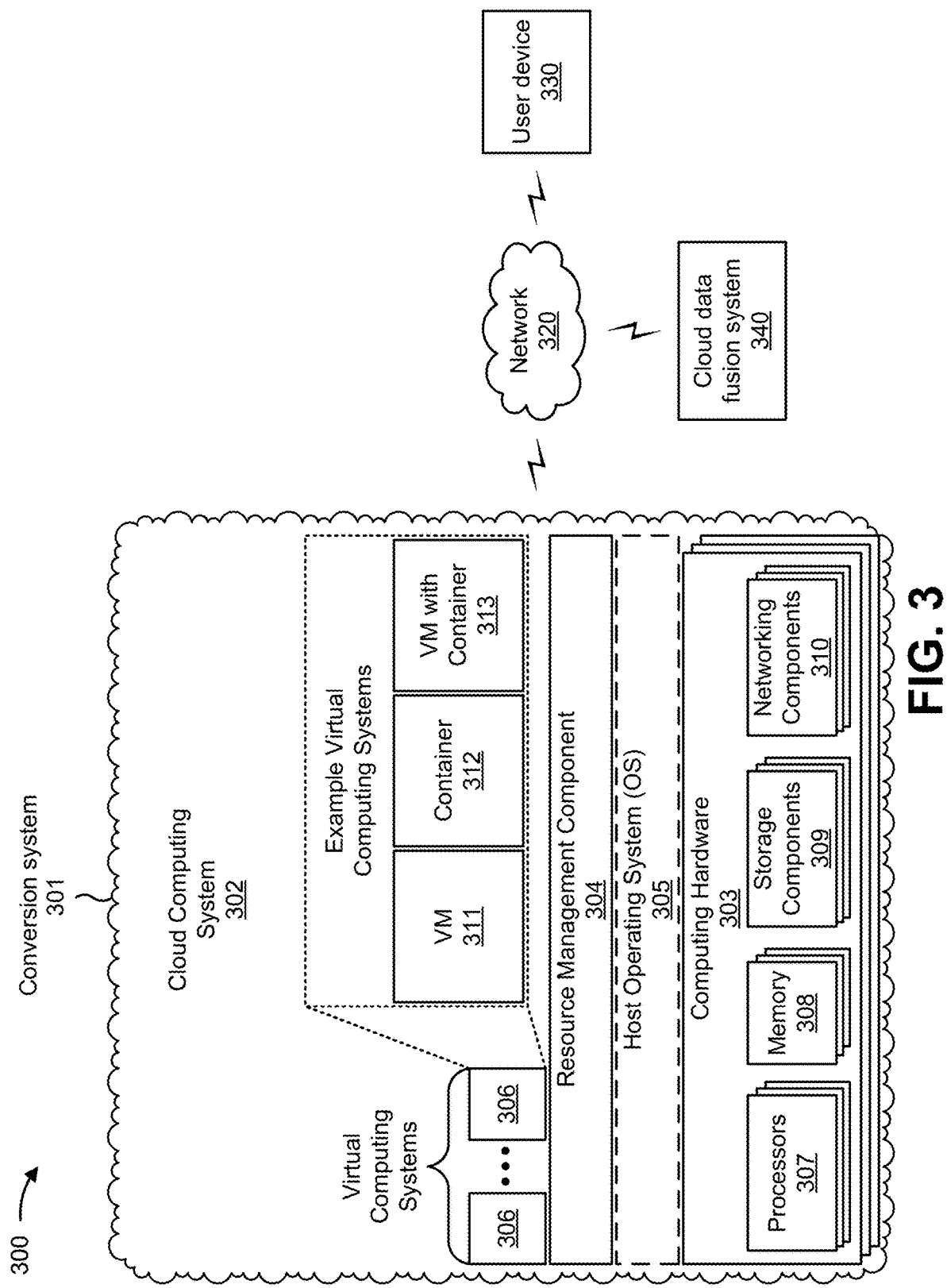
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include a conversion system 301, which may include one or more elements of and/or may execute within a cloud computing system 302. The cloud computing system 302 may include one or more elements 303-313, as described in more detail below. As further shown in FIG. 3, the environment 300 may include a network 320, a user device 330, and/or a cloud data fusion system 340. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the conversion system 301 may include one or more elements 303-313 of the cloud computing system 302, may execute within the cloud computing system 302, and/or may be hosted within the cloud computing system 302, in some implementations, the conversion system 301 may not be cloud-based (e.g., may be implemented outside of a cloud computing system) or may be partially cloud-based. For example, the conversion system 301 may include one or more devices that are not part of the cloud computing system 302, such as device 400 of FIG. 4, which may include a standalone server or another type of computing device. The conversion system 301 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of the environment 300.

The user device 330 may include one or more devices capable of receiving, generating, storing, processing, and/or providing information, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud data fusion system 340 may include one or more devices capable of receiving, generating, storing, processing, providing, and/or routing information, as described elsewhere herein. The cloud data fusion system 340 may include a communication device and/or a computing device. For example, the cloud data fusion system 340 may include a server, such as an application server, a client server, a web server, a database server, a host server, a proxy server, a virtual server (e.g., executing on computing hardware), or a server in a cloud computing system. In some implementations, the cloud data fusion system 340 may include computing hardware used in a cloud computing environment.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
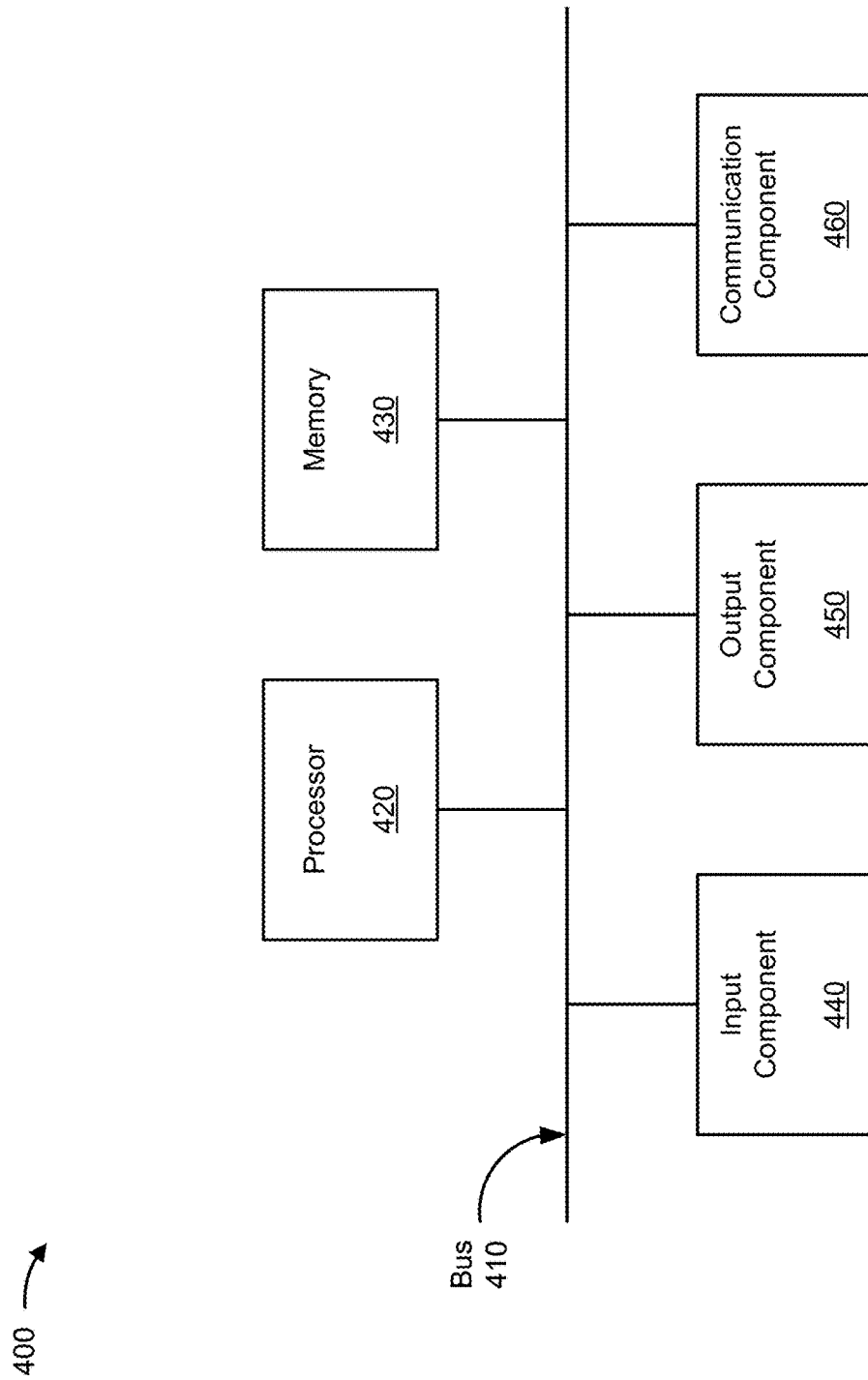
FIG. 4 is a diagram of example components of one or more devices of FIG. 3.

FIG. 4 is a diagram of example components of a device 400, which may correspond to the conversion system 301, the user device 330, and/or the cloud data fusion system 340. In some implementations, the conversion system 301, the user device 330, and/or the cloud data fusion system 340 may include one or more devices 400 and/or one or more components of the device 400. As shown in FIG. 4, the device 400 may include a bus 410, a processor 420, a memory 430, an input component 440, an output component 450, and a communication component 460.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The input component 440 enables the device 400 to receive input, such as user input and/or sensed inputs. For example, the input component 440 may include a touch screen, a keyboard, a keypad, a mouse, a button, a microphone, a switch, a sensor, a global positioning system component, an accelerometer, a gyroscope, an actuator, and/or the like. The output component 450 enables the device 400 to provide output, such as via a display, a speaker, and/or one or more light-emitting diodes. The communication component 460 enables the device 400 to communicate with other devices, such as via a wired connection and/or a wireless connection. For example, the communication component 460 may include a receiver, a transmitter, a transceiver, a modem, a network interface card, an antenna, and/or the like.

The device 400 may perform one or more processes described herein. For example, a non-transitory computer-readable medium (e.g., the memory 430) may store a set of instructions (e.g., one or more instructions, code, software code, program code, and/or the like) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
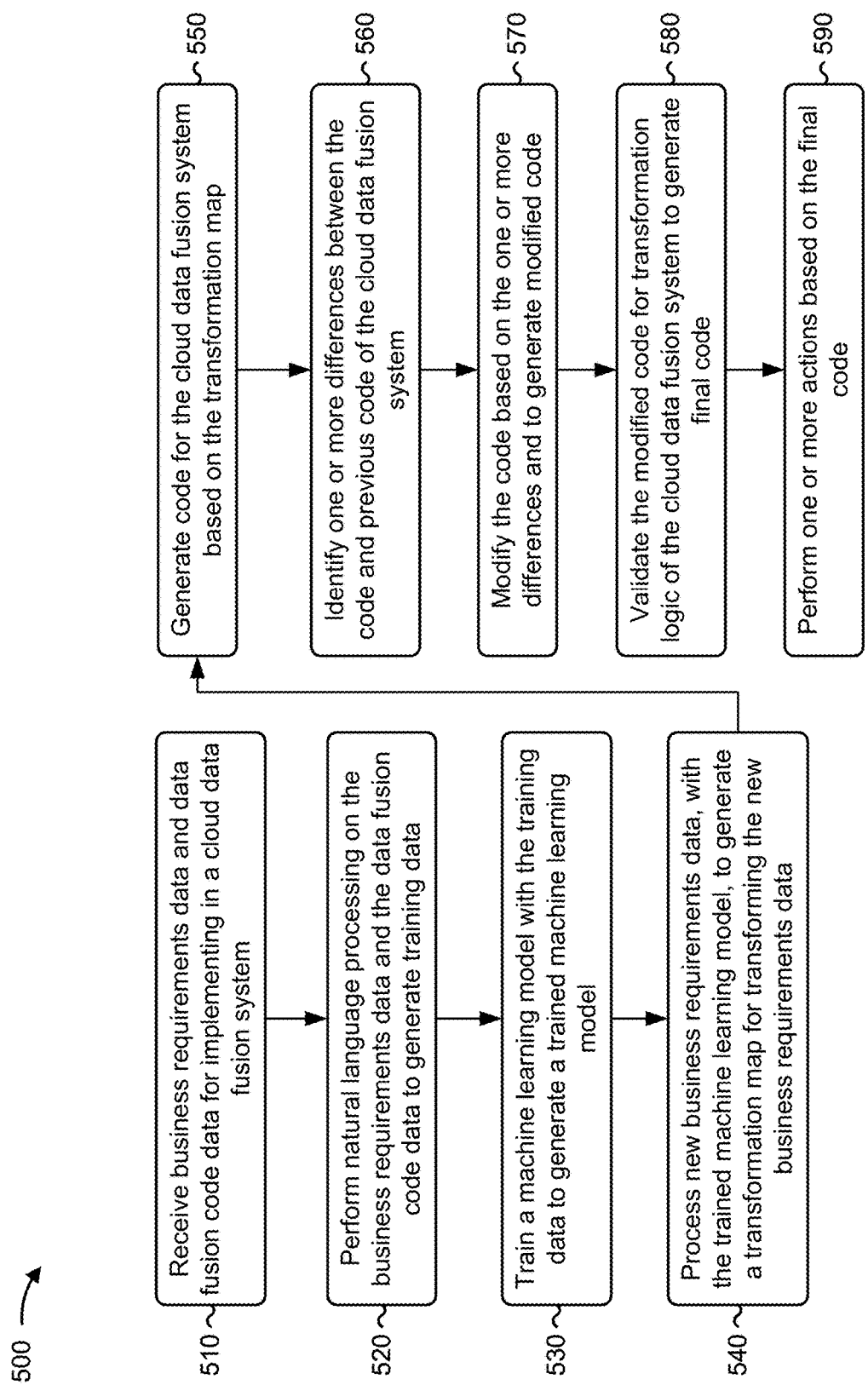
FIG. 5 is a flowchart of an example process for utilizing a machine learning model to convert requirements for implementation in a cloud data fusion environment.

FIG. 5 is a flowchart of an example process 500 for utilizing a machine learning model to convert requirements for implementation in a cloud data fusion environment. In some implementations, one or more process blocks of FIG.

5 may be performed by a device (e.g., the conversion system 301). In some implementations, one or more process blocks of FIG. 5 may be performed by another device or a group of devices separate from or including the device, such as a user device (e.g., the user device 330) and/or a cloud data fusion system (e.g., the cloud data fusion system 340). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving business requirements data and data fusion code data for implementing in a cloud data fusion system (block 510). For example, the device may receive business requirements data and data fusion code data for implementing in a cloud data fusion system, as described above.

As further shown in FIG. 5, process 500 may include performing natural language processing on the business requirements data and the data fusion code data to generate training data (block 520). For example, the device may perform natural language processing on the business requirements data and the data fusion code data to generate training data, as described above. In some implementations, performing the natural language processing on the business requirements data and the data fusion code data to generate the training data includes parsing the business requirements data and the data fusion code data to generate parsed data, and performing the natural language processing on the parsed data to generate the training data in a format for consumption by the machine learning model.

As further shown in FIG. 5, process 500 may include training a machine learning model with the training data to generate a trained machine learning model (block 530). For example, the device may train a machine learning model with the training data to generate a trained machine learning model, as described above.

As further shown in FIG. 5, process 500 may include processing new business requirements data, with the trained machine learning model, to generate a transformation map for transforming the new business requirements data (block 540). For example, the device may process new business requirements data, with the trained machine learning model, to generate a transformation map for transforming the new business requirements data, as described above. In some implementations, processing the new business requirements data, with the trained machine learning model, to generate the transformation map includes calculating input design coordinates based on the new business requirements data; calculating average Euclidean distances associated with the input design coordinates; determining one of the input design coordinates associated with a smallest average Euclidean distance; and generating the transformation map based on the one of the input design coordinates. In some implementations, determining the one of the input design coordinates associated with the smallest average Euclidean distance includes selecting a set of the input design coordinates satisfying a threshold; calculating additional average Euclidean distances between the set of the input design coordinates and requirements for the cloud data fusion system; and determining the one of the input design coordinates, from the set of the input design coordinates, based on the additional average Euclidean distances.

In some implementations, processing the new business requirements data, with the trained machine learning model, to generate the transformation map includes utilizing the trained machine learning model to determine recommendations for components and configuration sequences of the cloud data fusion system, and generating the transformation map based on the recommendations.

As further shown in FIG. 5, process 500 may include generating code for the cloud data fusion system based on the transformation map (block 550). For example, the device may generate code for the cloud data fusion system based on the transformation map, as described above. In some implementations, generating the code for the cloud data fusion system based on the transformation map includes initializing properties for components of the code to be utilized in the cloud data fusion system.

As further shown in FIG. 5, process 500 may include identifying one or more differences between the code and previous code of the cloud data fusion system (block 560). For example, the device may identify one or more differences between the code and previous code of the cloud data fusion system, as described above. In some implementations, identifying the one or more differences between the code and the previous code of the cloud data fusion system includes identifying one or more impacts of the one or more differences on the previous code of the cloud data fusion system.

As further shown in FIG. 5, process 500 may include modifying the code based on the one or more differences and to generate modified code (block 570). For example, the device may modify the code based on the one or more differences and to generate modified code, as described above.

As further shown in FIG. 5, process 500 may include validating the modified code for transformation logic of the cloud data fusion system to generate final code (block 580). For example, the device may validate the modified code for transformation logic of the cloud data fusion system to generate final code, as described above. In some implementations, validating the modified code for the transformation logic of the cloud data fusion system to generate the final code includes determining expected values based on the transformation logic, comparing the expected values and values determined for the modified code, and validating the modified code for the transformation logic of the cloud data fusion system, to generate the final code, based on the expected values being within a threshold of the values. In some implementations, validating the modified code for the transformation logic of the cloud data fusion system to generate the final code includes generating one or more validation errors based on the expected values failing to be within the threshold of the values, and retraining the machine learning model based on the one or more validation errors.

As further shown in FIG. 5, process 500 may include performing one or more actions based on the final code (block 590). For example, the device may perform one or more actions based on the final code, as described above. In some implementations, performing the one or more actions includes one or more of causing the final code to be implemented in the cloud data fusion system, providing the final code for display, or retraining the machine learning model based on the final code. In some implementations, performing the one or more actions includes receiving a change to the final code, and modifying the final code based on the change. In some implementations, performing the one or more actions includes receiving feedback associated with execution of the final code by the cloud data fusion system, and modifying the final code based on the feedback.

In some implementations, process 500 includes generating feedback based on validating the modified code, and performing the one or more actions includes retraining the machine learning model based on the feedback.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device, business requirements data and data fusion code data for implementing in a cloud data fusion system;
    performing, by the device, natural language processing on the business requirements data and the data fusion code data to generate training data;
    training, by the device, a machine learning model with the training data to generate a trained machine learning model;
    processing, by the device, new business requirements data, with the trained machine learning model, to generate a transformation map for transforming the new business requirements data;
    generating, by the device, code for the cloud data fusion system based on the transformation map;
    identifying, by the device, one or more differences between the code and previous code of the cloud data fusion system;
    modifying, by the device, the code based on the one or more differences and to generate modified code;
    validating, by the device, the modified code for transformation logic of the cloud data fusion system to generate final code; and
    performing, by the device, one or more actions based on the final code.

2. The method of claim 1, further comprising:
    generating feedback based on validating the modified code,
    wherein performing the one or more actions comprises:
        retraining the machine learning model based on the feedback.

3. The method of claim 1, wherein performing the natural language processing on the business requirements data and the data fusion code data to generate the training data comprises:
    parsing the business requirements data and the data fusion code data to generate parsed data; and
    performing the natural language processing on the parsed data to generate the training data in a format for consumption by the machine learning model.

4. The method of claim 1, wherein processing the new business requirements data, with the trained machine learning model, to generate the transformation map comprises:
    calculating input design coordinates based on the new business requirements data;
    calculating average Euclidean distances associated with the input design coordinates;
    determining one of the input design coordinates associated with a smallest average Euclidean distance; and
    generating the transformation map based on the one of the input design coordinates.

5. The method of claim 4, wherein determining the one of the input design coordinates associated with the smallest average Euclidean distance comprises:
    selecting a set of the input design coordinates satisfying a threshold;
    calculating additional average Euclidean distances between the set of the input design coordinates and requirements for the cloud data fusion system; and determining the one of the input design coordinates, from the set of the input design coordinates, based on the additional average Euclidean distances.

6. The method of claim 1, wherein processing the new business requirements data, with the trained machine learning model, to generate the transformation map comprises:
utilizing the trained machine learning model to determine recommendations for components and configuration sequences of the cloud data fusion system; and
generating the transformation map based on the recommendations.

7. The method of claim 1, wherein generating the code for the cloud data fusion system based on the transformation map comprises:
initializing properties for components of the code to be utilized in the cloud data fusion system.

8. A device, comprising:
one or more memories; and
one or more processors, coupled to the one or more memories, configured to:
receive business requirements data for implementing in a cloud data fusion system;
process the business requirements data, with a machine learning model, to generate a transformation map for transforming the business requirements data;
generate code for the cloud data fusion system based on the transformation map;
identify one or more differences between the code and previous code of the cloud data fusion system;
modify the code based on the one or more differences and to generate modified code;
validate the modified code for transformation logic of the cloud data fusion system to generate final code; and
perform one or more actions based on the final code.

9. The device of claim 8, wherein the one or more processors, to identify the one or more differences between the code and the previous code of the cloud data fusion system, are configured to:
identify one or more impacts of the one or more differences on the previous code of the cloud data fusion system.

10. The device of claim 8, wherein the one or more processors, to validate the modified code for the transformation logic of the cloud data fusion system to generate the final code, are configured to:
determine expected values based on the transformation logic;
compare the expected values and values determined for the modified code; and
validate the modified code for the transformation logic of the cloud data fusion system, to generate the final code, based on the expected values being within a threshold of the values.

11. The device of claim 10, wherein the one or more processors, to validate the modified code for the transformation logic of the cloud data fusion system to generate the final code, are configured to:
generate one or more validation errors based on the expected values failing to be within the threshold of the values; and
retrain the machine learning model based on the one or more validation errors.

12. The device of claim 8, wherein the one or more processors, to perform the one or more actions, are configured to one or more of:
cause the final code to be implemented in the cloud data fusion system;
provide the final code for display; or
retrain the machine learning model based on the final code.

13. The device of claim 8, wherein the one or more processors, to perform the one or more actions, are configured to:
receive a change to the final code; and
modify the final code based on the change.

14. The device of claim 8, wherein the one or more processors, to perform the one or more actions, are configured to:
receive feedback associated with execution of the final code by the cloud data fusion system; and
modify the final code based on the feedback.

15. A non-transitory computer-readable medium storing a set of instructions, the set of instructions comprising:
one or more instructions that, when executed by one or more processors of a device, cause the device to:
receive business requirements data and data fusion code data for implementing in a cloud data fusion system;
perform natural language processing on the business requirements data and the data fusion code data to generate training data;
train a machine learning model with the training data to generate a trained machine learning model;
receive new business requirements data for implementing in the cloud data fusion system;
process the new business requirements data, with the trained machine learning model, to generate a transformation map for transforming the new business requirements data;
generate code for the cloud data fusion system based on the transformation map;
identify one or more differences between the code and previous code of the cloud data fusion system;
modify the code based on the one or more differences and to generate modified code;
validate the modified code for transformation logic of the cloud data fusion system to generate final code; and
perform one or more actions based on the final code.

16. The non-transitory computer-readable medium of claim 15, wherein the one or more instructions, that cause the device to perform the natural language processing on the business requirements data and the data fusion code data to generate the training data, cause the device to:
parse the business requirements data and the data fusion code data to generate parsed data; and
perform the natural language processing on the parsed data to generate the training data in a format for consumption by the machine learning model.

17. The non-transitory computer-readable medium of claim 15, wherein the one or more instructions, that cause the device to process the new business requirements data, with the trained machine learning model, to generate the transformation map, cause the device to:
calculate input design coordinates based on the new business requirements data;
calculate average Euclidean distances associated with the input design coordinates;
determine one of the input design coordinates associated with a smallest average Euclidean distance; and
generate the transformation map based on the one of the input design coordinates.

18. The non-transitory computer-readable medium of claim 17, wherein the one or more instructions, that cause the device to determine the one of the input design coordinates associated with the smallest average Euclidean distance, cause the device to:
- select a set of the input design coordinates satisfying a threshold;
- calculate additional average Euclidean distances between the set of the input design coordinates and requirements for the cloud data fusion system; and
- determine the one of the input design coordinates, from the set of the input design coordinates, based on the additional average Euclidean distances.

19. The non-transitory computer-readable medium of claim 15, wherein the one or more instructions, that cause the device to process the new business requirements data, with the trained machine learning model, to generate the transformation map, cause the device to:
- utilize the trained machine learning model to determine recommendations for components and configuration sequences of the cloud data fusion system; and
- generate the transformation map based on the recommendations.

20. The non-transitory computer-readable medium of claim 15, wherein the one or more instructions, that cause the device to validate the modified code for the transformation logic of the cloud data fusion system to generate the final code, cause the device to:
- determine expected values based on the transformation logic;
- compare the expected values and values determined for the modified code;
  - validate the modified code for the transformation logic of the cloud data fusion system, to generate the final code, based on the expected values being within a threshold of the values; or
  - generate one or more validation errors based on the expected values failing to be within the threshold of the values; and
- retrain the machine learning model based on the one or more validation errors.

* * * * *